United States Patent
Yang et al.

(10) Patent No.: US 9,982,081 B2
(45) Date of Patent: May 29, 2018

(54) CYCLIC OLEFIN COPOLYMERS AND METHODS OF MAKING THEM

(71) Applicant: ExxonMobil Chemical Patents Inc., Baytown, TX (US)

(72) Inventors: Yong Yang, Kingwood, TX (US); Donna J. Crowther, Seabrook, TX (US); Jacqueline A. Lovell, Crosby, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days. days.

(21) Appl. No.: 15/233,481

(22) Filed: Aug. 10, 2016

(65) Prior Publication Data

US 2017/0233516 A1    Aug. 17, 2017

Related U.S. Application Data

(60) Provisional application No. 62/294,447, filed on Feb. 12, 2016.

(51) Int. Cl.

| | | |
|---|---|---|
| *C08L 23/08* | (2006.01) | |
| *C08F 210/02* | (2006.01) | |
| *C08F 210/14* | (2006.01) | |
| *C08F 4/6592* | (2006.01) | |
| *C08F 232/08* | (2006.01) | |
| *C08L 45/00* | (2006.01) | |

(52) U.S. Cl.
CPC ........ *C08F 232/08* (2013.01); *C08F 4/65927* (2013.01); *C08F 210/02* (2013.01); *C08F 210/14* (2013.01); *C08L 23/0823* (2013.01); *C08L 45/00* (2013.01); *C08F 2420/04* (2013.01); *C08F 2500/09* (2013.01); *C08F 2500/11* (2013.01); *C08F 2500/21* (2013.01); *C08F 2500/25* (2013.01)

(58) Field of Classification Search
CPC ... C08L 23/0823; C08F 210/02; C08F 210/14
See application file for complete search history.

(56) References Cited

U.S. PATENT DOCUMENTS

| | | | |
|---|---|---|---|
| 3,984,610 | A | 10/1976 | Elston |
| 5,498,677 | A | 3/1996 | Weller et al. |
| 5,552,504 | A | 9/1996 | Bennett et al. |
| 5,602,219 | A | 2/1997 | Aulbach et al. |
| 5,621,054 | A | 4/1997 | Harrington |
| 5,635,573 | A * | 6/1997 | Harrington ........... C08F 210/00 526/113 |
| 6,180,123 | B1 | 1/2001 | Mondet |
| 6,384,162 | B1 | 5/2002 | Zahalka et al. |
| 6,458,919 | B1 | 10/2002 | Osan et al. |
| 6,506,857 | B2 † | 1/2003 | Rix |
| 8,236,910 | B2 | 8/2012 | Ruchatz et al. |
| 2008/0113116 | A1 | 5/2008 | Hiraike et al. |
| 2008/0281063 | A9 † | 11/2008 | Sukhadia |
| 2010/0105851 | A1 | 4/2010 | Van Doremaele et al. |
| 2011/0021731 | A1 | 1/2011 | Hirata et al. |
| 2011/0256373 | A1 | 10/2011 | Tatarka et al. |
| 2012/0003410 | A1 | 1/2012 | Tatarka |
| 2012/0021151 | A1 † | 1/2012 | Tatarka |
| 2012/0124430 | A1 * | 5/2012 | Dharmasanam ........ H04L 12/12 714/48 |
| 2012/0258326 | A1 | 10/2012 | Pham et al. |
| 2014/0162041 | A1 | 6/2014 | Jester et al. |
| 2016/0136884 | A1 * | 5/2016 | Kneale ............... B29C 67/0051 428/201 |

FOREIGN PATENT DOCUMENTS

| | | |
|---|---|---|
| CA | 2 179 355 A | 12/1996 |
| JP | 2003/313247 | 11/2003 |
| KR | 2004/0065110 | 7/2004 |

OTHER PUBLICATIONS

Dongpeng et al, "Structural Characterization of metallocene cycloolefin copolymer fiber development", Synthetic Fiber Industry, 2011 34(4) 34-36.
Rwei et al., "Investigation on the spinnability of metallocene cyclic olefins copolymer melt", Textile Research Journal, 2012, vol. 82(4), pp. 315-323.
Thorshuag et al., "Poly(ethene-co-norbornene) Obtained with a Constrained Geometry Catalyst. A Study of Reaction Kinetics and Copolymer Properties", Macromolecules, 2002, vol. 35, pp. 2903-2911.
Kaminsky et al., "Polymerization of Ethene and Longer Chained Olefins by Metallocene Catalysis", Macromol. Symp., 2005, vol. 226, pp. 25-34.†
Lamnawar et al., "Rheological, Morphological, and Heat Seal Properties of Linear Low Density Polyethylene and Cyclo Olefine Copolymer (LLDPE/COC) Blends", J. Applied Polymer Science, 2010 (online), vol. 116, pp. 2015-2022.†
Stadler et al., "Influence of Type and Content of Various Comonomers on Long-Chain Branching of Ethene/alpha-Olefin Copolymers", Macromolecules, 2006, 39, pp. 1474-1482.†

* cited by examiner
† cited by third party

Primary Examiner — Caixia Lu

(57) ABSTRACT

A process for making a branched cyclic olefin copolymer (bCOC), and the bCOC therefrom, comprising combining at a temperature within a range from 60° C. to 140° C. a catalyst precursor and an activator with a feed comprising ethylene and at least one cyclic olefin; where the catalyst precursor is selected from the group consisting of $C_S$-symmetric Group 4 metallocenes comprising any two ligands selected from cyclopentadienyl and ligands isolobal to the cyclopentadienyl group. The resulting bCOC is desirably semi-crystalline and useful in such articles as tubing, thermoformed and foamed articles.

11 Claims, 7 Drawing Sheets

CYCLIC OLEFIN COPOLYMERS AND METHODS OF MAKING THEM

This application claims priority to U.S. Provisional Application No. 62/294,447 filed Feb. 12, 2016, the disclosure of which is fully incorporated herein by reference.

FIELD OF THE INVENTION

The present disclosure relates to cyclic olefin copolymers, and more particularly to semi-crystalline, elastomeric cyclic olefin copolymers with long chain branching, and the methods of forming them by contacting catalyst precursor and cyclic olefins under suitable conditions.

BACKGROUND OF THE INVENTION

Cyclic olefin copolymers ("COC's") can be broadly defined as polyolefins with cyclic olefin comonomers. Conventionally, and more specifically, COC's may refer to ethylene-norbornene copolymers. Most of the commercial COC's are amorphous and linear, with 40 mol % or more norbornene-derived comonomer unit concentrations. Typically COC's have high use-temperatures which make them ideal in optical applications, and applications requiring high stiffness and strength, as well as excellent moisture barrier and polar chemical resistance. However, traditional COC's suffer from poor toughness, insufficient oxygen barrier abilities, oil resistance, and difficulty in processing the neat resins. In particular, the poor miscibility of amorphous COC's with most of the polyolefins, which are typically semi-crystalline, also limits the broader applications and value proposition in blends and composites. One commercial example of a COC is manufactured and sold as Topas™ E-140 copolymer, which is a semi-crystalline elastomeric COC that retained the good optical properties of amorphous COC's and additionally gave rise to elasticity and improved toughness. However, the commercial semi-crystalline elastomeric COC has some limitations, such as the requirement of a certain tubing wall thickness to maintain kink resistance in tubing applications, as well as poor processability.

Relevant disclosures include U.S. Pat. No. 3,984,610; U.S. Pat. No. 5,498,677; U.S. Pat. No. 5,552,504; U.S. Pat. No. 5,621,054; U.S. Pat. No. 6,180,123; U.S. Pat. No. 6,384,162; U.S. Pat. No. 6,458,919; US 2010/105851; US 2011/021731; US 2011/256373; US 2012/258326; US 2014/162041; JP 2003/313247; and KR 2004/0065110, as well as:

- S.-P. Rwei et al., "Investigation on the spinnability of metallocene cyclic olefins copolymer melt," in 82(4) TEXTILE RESEARCH J. 315-323 (2012);
- D. Dai et al., "Characterization of structure and properties of metallocene-catalyzed cycloolefin copolymer and development of fiber therefrom," in 34(4) HECHENG XIANWEI GONGYE 34-36 (2011); and
- K. Thorshuag et al., "Poly(ethylene-co-norbornene) obtained with a constrained geometry catalyst. A study of reaction kinetics and copolymer properties," in 33 MACROMOLECULES 2903-2911 (2002).

SUMMARY

Disclosed is a composition comprising a branched cyclic olefin copolymer (bCOC), the bCOC comprising within the range from 98 wt % to 50 wt % ethylene derived monomer units; and within the range from 2 wt % to 50 wt % of cyclic olefin derived monomer units; the composition comprising polyethylene and within the range from 0.2 wt % to 10 wt %, the composition possessing a Strain Hardening Ratio (SHR) at 2.5 Hencky strain of greater than 1.0.

Also disclosed is a process for making a branched cyclic olefin copolymer (bCOC) comprising combining at a temperature within a range from 60° C. to 140° C. a catalyst precursor and an activator with a feed comprising ethylene and at least one cyclic olefin; where the catalyst precursor is selected from the group consisting of $C_S$-symmetric Group 4 metallocenes comprising any two ligands selected from cyclopentadienyl and ligands isolobal to the cyclopentadienyl group.

DETAILED DESCRIPTION

Figure 1:
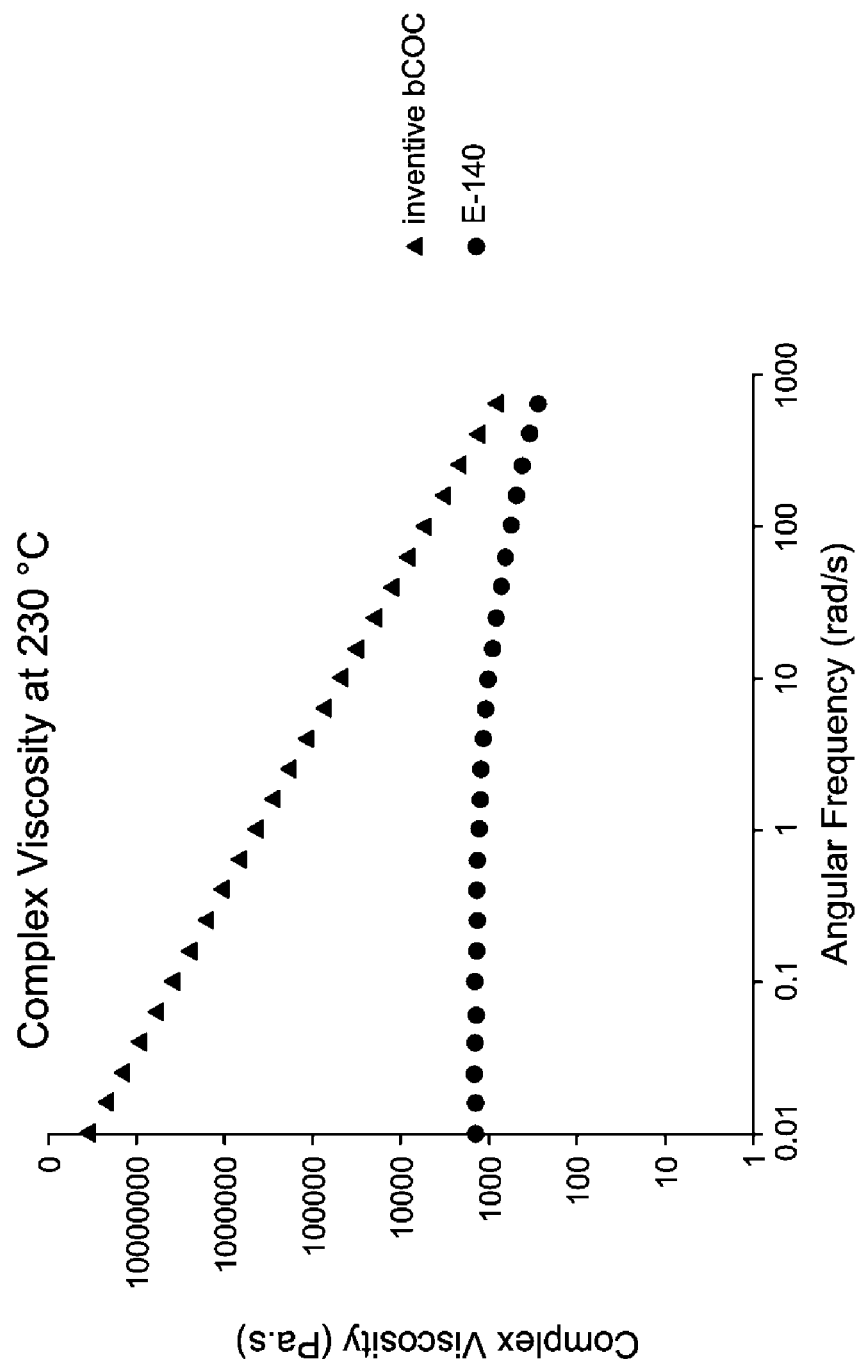
FIG. 1 is a plot of the Complex Viscosity at 230° C. as a function of angular frequency of a bCOC as described herein and a comparative Topas™ E-140 grade COC.

The present disclosure solves problems in prior art COC's by providing semi-crystalline elastomeric COC's with long-chain branching ("LCB"). The synergy of semi-crystallinity and LCB characteristics enables better miscibility with polyethylenes, improves processability, and enhances oxygen barrier and oil resistance properties, in addition to maintaining the beneficial properties that traditional COC's possess (e.g., high purity, high moisture barrier, good polar chemical resistance). The branched COC's disclosed herein ("bCOC") also offer a broader product scope and more added value, either used as a neat resin or as a modifier for various types of polyolefins and more rigid COCs. Compared to commercial linear semi-crystalline elastomeric COC, the inventive bCOC's demonstrate better permanent set and higher modulus and strength, which could potentially allow down gauged tubing wall thickness and maintain kink resistance. Used as a low-loading additive in LLDPE, the bCOC's demonstrated significant strain hardening that is not observed in existing COC's.

Thus, in any embodiment, is disclosed a process for making a branched cyclic olefin copolymer (bCOC) comprising combining a catalyst precursor and an activator at a temperature within a range from 60, or 70, or 80° C. to 110, or 120, or 130, or 140° C. (e.g., the reactor temperature with all catalyst and monomer components combined with one another) with a feed comprising (or consisting essentially of, or consisting of) ethylene and at least one cyclic olefin; where the catalyst precursor is selected from the group consisting of $C_S$-symmetric Group 4 metallocenes comprising any two ligands selected from cyclopentadienyl and ligands isolobal to the cyclopentadienyl group. Preferably, the catalyst precursor is selected from $C_S$-symmetric ansa-metallocenes.

As used herein "Group 4" refers to the new notation of the Periodic Table of the Elements as published in HAWLEY'S CONDENSED CHEMICAL DICTIONARY, 13$^{th}$ Edition (John Wiley & Sons, Inc. 1997).

Also as used herein "combining" means that the named components are brought together to make contact with one another, such as in a polymerization reactor, under such conditions of temperature, pressure, solvent, and other environmental conditions that effect a chemical reaction between one or more monomers that is typically catalyzed by the presence of a catalyst precursor and activator.

Even more preferably, in any embodiment, the ligands of the $C_S$-symmetric Group 4 metallocenes that are isolobal to the cyclopentadienyl group are selected from indenyl, benzindenyl, fluorenyl, octahydrofluorenyl, cyclooctatetraenyl, cyclopentaphenanthrenyl, hydrogenated or partially hydrogenated versions thereof, substituted versions thereof, and heterocyclic versions (preferably one or two substitutions of ring carbons for nitrogen, oxygen, sulfur, silicon, and/or phosphorous) thereof.

As used herein "substituted versions thereof" or "substituted" in reference to a hydrocarbon means that the named hydrocarbon moiety may also comprise, in place of one or more hydrogens, preferably one to two hydrogens, a C1 to C6 alkyl, preferably methyl or ethyl, a phenyl or other C7 to C20 aromatic hydrocarbon (or "aryl"), an aniline, imidazole or other nitrogen heterocycle, halogen, hydroxyl, carboxylate, succinate, glycol, and/or mercaptans.

In any embodiment, at least one of the two ligands is mono- or di-substituted with groups selected from C1 to C12 alkyls, C3 to C16 iso-alkyls, C6 to C24 aryls, C9 to C24 fused multi-ring aryls, C5 to C20 nitrogen and/or sulfur heterocycles, and combinations thereof. More preferably, at least one of the two ligands is mono- or di-substituted with groups selected from iso-propyl, iso-butyl, tert-butyl, phenyl, alkylphenyl, and dialkylphenyl. Also, in any embodiment, the bridging group that covalently links the any two ligands described herein comprises at least one phenyl group, alkyl substituted phenyl group, or silyl substituted phenyl group.

In any embodiment, the catalyst precursor is selected from the following structures (I):

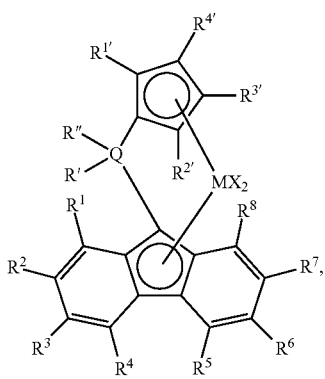

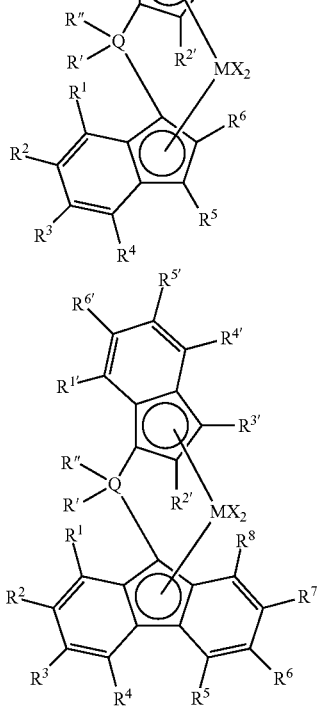

wherein M is a Group 4 metal, preferably zirconium or hafnium; Q is silicon or carbon; each of R' and R" are independently selected from phenyl, alkyl substituted phenyl, and silyl substituted phenyl; each X is independently selected from C1 to C10 alkyls, phenyls, and halogens; each of $R^1$ to $R^8$ is independently selected from hydrogen, C1 to C10 alkyls, phenyls, and alkylphenyls; and each of to $R^{6'}$ is independently selected from hydrogen, C1 to C10 alkyls, and phenyls.

More preferably, the catalyst precursor is selected from the following structure (II):

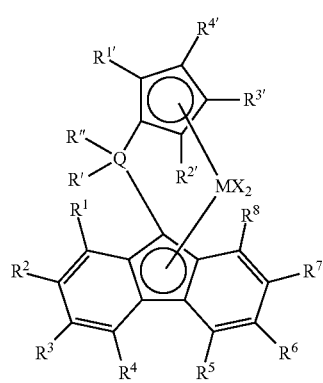

wherein M is a Group 4 metal, preferably zirconium or hafnium; Q is silicon or carbon; each of R' and R" are independently selected from phenyl, alkyl substituted phenyl, and silyl substituted phenyl; each X is independently selected from C1 to C10 alkyls, phenyls, and halogens; each of $R^1$ to $R^8$ is independently selected from hydrogen, C1 to C10 alkyls, phenyls, and alkylphenyls; and each of to $R^{6'}$ is independently selected from hydrogen, C1 to C10 alkyls, and phenyls. In any embodiment, the M in any of the structures above is hafnium, and each of R' and R" are phenyl-p-tri-(C1 to C6)-silyl groups.

The catalyst precursor must also be combined with at least one activator to effect polymerization of the cyclic olefin monomers and ethylene, wherein the activator preferably comprises a non-coordinating borate anion and a bulky organic cation. In any embodiment, the non-coordinating borate anion comprises a tetra(perfluorinated C6 to C14 aryl)borate anion and substituted versions thereof; most preferably the non-coordinating borate anion comprises a tetra(pentafluorophenyl)borate anion or tetra(perfluoronaphthyl)borate anion. Preferably the bulky organic cation is selected from the following structures (IIIa) and (IIIb):

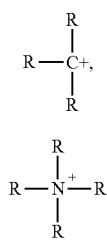

wherein each R group is independently hydrogen, a C6 to C14 aryl (e.g., phenyl, naphthyl, etc.), a C1 to C10 or C20 alkyl, or substituted versions thereof; and more preferably at least one R group is an C6 to C14 aryl or substituted versions thereof.

In any embodiment, the bulky organic cation is a reducible Lewis Acid, especially a trityl-type cation (wherein each "R" group in (IIIa) is aryl) capable of extracting a ligand from the catalyst precursor, where each "R" group is an C6 to C14 aryl group (phenyl, naphthyl, etc.) or substituted C6 to C14 aryl, and preferably the reducible Lewis acid is triphenyl carbenium and substituted versions thereof.

Also, in any embodiment, the bulky organic cation is a Brønsted acid capable of donating a proton to the catalyst precursor, wherein at least one "R" group in (IIIb) is hydrogen. Exemplary bulky organic cations of this type in general include ammoniums, oxoniums, phosphoniums, silyliums, and mixtures thereof; preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, and p-nitro-N,N-dimethylaniline; phosphoniums from triethylphosphine, triphenylphosphine, and diphenylphosphine; oxoniums from ethers, such as dimethyl ether diethyl ether, tetrahydrofuran, and dioxane; and sulfoniums from thioethers, such as diethyl thioethers and tetrahydrothiophene, and mixtures thereof.

The catalyst precursor preferably reacts with the activator upon their combination to form a "catalyst" or "activated catalyst" that can then effect the polymerization of monomers. The catalyst may be formed before combining with monomers, after combining with monomers, or simultaneous therewith.

In any embodiment, the cyclic olefin monomer that is combined with ethylene monomers in the polymerization process is selected from C5 to C8, or C12, or C16, or C20 olefins comprising at least one C5 to C8 cyclic structure, such as, for example, bicyclo compounds such as bicyclo-(2,3,1)-heptene-2. Preferably the cyclic olefin is selected from C5, or C6 to C8, or C10, or C12, or C20 cyclic olefins, and more preferably bicyclic olefins which are cyclic olefins containing a bridging hydrocarbon moiety that forms two rings in the overall structure such as in bicyclo-(2,3,1)-heptene-2 (norbornenes). Most preferably the cyclic olefins are selected from norbornenes, tetracyclododecene, and substituted versions thereof. In order to effect the polymerization process upon combining, as well as combining at a desirable temperature, the components are preferably combined at a pressure of at least 0.8, or 1, or 2, or 3 MPa; or within a range from 0.8, or 1, or 2, or 3 MPa to 4, or 6, or 8, or 10 MPa. This pressure can come from the addition of the ethylene and/or other gases in the polymerization reactor, and is of course influenced by the temperature of the reactor. The level of ethylene and cyclic olefin is adjusted to obtain the desired catalytic activity as well as desired level of cyclic olefin comonomer incorporation into the bCOCs described herein.

More particularly, the various monomers and catalyst precursors and activators are preferably combined in a polymerization reactor where they are allowed to react at the desired monomer concentrations, catalyst concentrations, temperatures and pressures. In any embodiment, the contacting takes place in a polymerization reactor having an inlet for the monomer and/or catalyst feeds, and an outlet for the effluent of the polymerization reaction, wherein the amount of bCOC in the effluent is within a range from 2 or 4 or 6 wt % to 12 or 14 or 16 or 20 wt % based on the weight of the components in the solvent of the effluent stream. The polymerization reaction may be any type of polymerization useful in forming polyolefins such as so-called gas phase reactions, solution reactions or slurry reactions, preferably continuous solution, slurry or gas phase reactions.

In any embodiment, the bCOC is made in what is commonly known as "solution" process. For example, copolymerizations are preferably carried out in one or more single-phase, liquid-filled, stirred tank reactors with continuous flow of feeds to the system and continuous withdrawal of products under steady state conditions. When more than one reactor is used, the reactors may be operated in a serial or parallel configuration making essentially the same or different polymer components. Advantageously, the reactors may produce polymers with different properties, such as different molecular weights, or different monomer compositions, or different levels of long-chain branching, or any combinations thereof. All polymerizations can be performed in a system with a solvent comprising any one or more of C4 to C12 alkanes and/or the olefin monomers, using soluble metallocene catalysts or other single-site catalysts and discrete, non-coordinating borate anions as co-catalysts. A homogeneous dilute solution of tri-n-octyl aluminum in a suitable solvent may be used as a scavenger in concentrations appropriate to maintain reaction. Chain transfer agents, such as hydrogen, can be added to control molecular weight. Polymerizations can be at high temperatures described above and high conversions to maximize macromer re-insertions that create long chain branching, if so desired. This combination of a homogeneous, continuous, solution process helps to ensure that the polymer products have narrow composition and sequence distributions.

In any embodiment, the contacting (or polymerization) takes place in two stages or two reactors to produce two bCOCs that are combined in situ or ex situ, each bCOC having any one or more properties that are distinct such as different weight average molecular weights, and/or different levels of short and/or long chain branching. As described above, when more than one reactor is used, the reactors may be operated in a serial or parallel configuration making essentially the same or different polymer components.

In any embodiment, the reactor(s) can be maintained at a pressure in excess of the vapor pressure of the reactant mixture to keep the reactants in the liquid phase. In this manner the reactors can be operated liquid-full in a homogeneous single phase. Ethylene and cyclic olefin feeds (as well as optional propylene, C4 to C12 α-olefins and/or dienes) can be combined into one stream and then mixed with a pre-chilled hexane stream. A solution of a tri-n-octyl aluminum scavenger in a desirable solvent may be added to the combined solvent and monomer stream just before it entered the reactor to further reduce the concentration of any catalyst poisons. A mixture of the catalyst components (catalyst precursor and/or activator) in solvent may be pumped separately to the reactor and entered through a separate port. In another embodiment, cooled isothermal reactors can be used that do not require feed chilling.

As mentioned above, optional "dienes" may be added to the polymerization medium, including so-called "dual-polymerizable dienes" and "non-conjugated dienes". In any embodiment, the "dual-polymerizable dienes" are selected from vinyl substituted strained bicyclic and unconjugated dienes, and alpha-omega linear dienes where both sites of unsaturation are polymerizable by a polymerization catalyst (e.g., Ziegler-Natta, vanadium, metallocene, etc.); and more preferably from non-conjugated vinyl norbornenes and C8-C12 alpha-omega linear dienes (e.g., 1,7-heptadiene and 1,9-decadiene), and is most preferably 5-vinyl-2-norbornene. In any embodiment, the mole percent of the dual-polymerizable diene that is combined (i.e., present in the feed leading to the polymerization reactor) is less than 0.30, or 0.28, or 0.26 mol % relative to the other monomers, or within a range from 0.05 to 0.26 or 0.28 or 0.30 mol %. The bCOC formed therefrom comprise "dual-polymerizable diene derived monomer units".

In any embodiment, a "non-conjugated diene" is one in which only one of the double bonds is activated by a polymerization catalyst and is selected from cyclic and linear alkylenes, non-limiting examples of which include 1,5-cyclooctadiene, an unconjugated diene (and other structures where each double bond is two carbons away from the other), norbornadiene, and other strained bicyclic and unconjugated dienes, and dicyclopentadiene. More preferably, the non-conjugated diene is selected from C7 to C30 cyclic non-conjugated dienes. Most preferably the non-conjugated diene is 5-ethylidene-2-norbornene. The bCOC formed therefrom comprise "non-conjugated diene derived monomer units".

Most preferably, dienes are absent from the polymerization process, that is, they are not purposefully combined with the cyclic olefin, ethylene, and catalyst components in any stage of the process of forming the bCOC's described herein.

The reaction mixture may be stirred aggressively by any means known in the art to provide thorough mixing over a broad range of solution viscosities. Flow rates can be set to maintain an average residence time in the reactor of 5 to 10 or 20 mins. On exiting the reactor the copolymer mixture may be subjected to quenching, a series of concentration steps, heat and vacuum stripping and pelletization, or alternatively, may be fed to a subsequent reactor where another α-olefin such as propylene will be copolymerized, or fed to a line containing solution or slurry (or a combination of both) polyolefin where intimate mixing may occur. Water or water/alcohol mixture is then supplied to quench the polymerization reaction, which might otherwise continue in the presence of surviving catalyst, unreacted monomer, and elevated temperature. Antioxidants can be also used to quench the polymerization reaction.

The bCOC can be recovered from the effluent of either the first polymerization step or the second polymerization step by separating the polymer from other constituents of the effluent using conventional separation means. For example, polymer can be recovered from either effluent by liquid-liquid separation or coagulation with a non-solvent, such as methanol, isopropyl alcohol, acetone, or n-butyl alcohol, or the polymer can be recovered by stripping the solvent or other media with heat or steam. After removal of solvent and monomer, pelletized polymer can be removed from the plant for physical blending with polyolefin. If in situ blends are preferred, the removal of solvent takes place after intimate mixing with the solution or slurry phase polyolefin.

The lean phase and volatiles removed downstream of the liquid phase separation can be recycled to be part of the polymerization feed. In the process, a degree of separation and purification takes place to remove polar impurities or internally unsaturated olefins that might undermine the activity of the catalyst. Otherwise any internally unsaturated olefins, which are difficult to polymerize would gradually build up in the lean phase and recycle streams. Any adverse effects on the polymerization activity may be mitigated by removing these olefins from the recycle stream and/or encouraging their incorporation in the polymer, favored by high polymerization temperatures. Such methods are well known in the art.

The result of the polymerization reaction upon combining the components, in any embodiment, is the branched cyclic olefin copolymer (bCOC) comprising (or consisting essentially of, or consisting of) within the range from 98 wt % to 75, or 60, or 50 wt % ethylene derived monomer units; and within the range from 2 wt % to 25, or 40, or 50 wt % of cyclic olefin derived monomer units, based on the weight of the bCOC. Stated another way, the cyclic olefin derived monomer units are present to within a range from 1, or 2, or 3 mol % to 8, or 10, or 12, or 16 mol %. In any embodiment, the bCOC comprises (or consists essentially of, or consists of) cyclic olefin-derived units that are the reaction product of C5 to C8, or C12, or C16, or C20 cyclic olefins comprising at least one C5 to C8 cyclic structure, and more preferably those cyclic olefins such as those described above that are combined with the ethylene and catalyst components.

The molar mass of the bCOC's may be controlled by known means such as addition of hydrogen to the polymerization reactor when combining the monomers with the catalyst to effect polymerization. In any embodiment, the number average molecular weight (Mn) of the bCOC's described herein is within a range from 20, or 30 kg/mole to 60, or 80, or 100, or 140 kg/mole. In any embodiment, the weight average molecular weight (Mw) of the bCOC is within a range from 60, or 70, or 80 kg/mole to 120, or 140, or 160, or 200, or 300 kg/mole. In any embodiment, the z-average molecular weight (Mz) is within a range from 100, or 120, or 140 kg/mole to 200, or 250, or 300, or 350 kg/mole. In any embodiment, the bCOC's described herein have an Mz/Mw of greater than 2.2, or 2.4, or 2.6, or within a range from 2.2, or 2.4, or 2.6 to 3.0, or 3.2, or 3.4.

The bCOC's disclosed herein have desirable crystalline or semi-crystalline properties that are reflected in measureable Differential Scanning calorimeter (DSC) parameters. In any embodiment, the bCOC has a melting point temperature ($T_m$) within the range from 40, or 50, or 60, or 70, or 85, or 90° C. to 95, or 105, or 110, or 120° C. Also in any embodiment, the bCOC has one or more glass-transition temperatures ($T_g$), the largest (highest amplitude on y-axis of DSC trace) of which has a $T_g$ that is within the range from −20, or −15, or −10° C. to 10, or 15, or 20° C. Also, in any embodiment, the bCOC has a percent crystallinity within a range from 20, or 22, or 24, or 25, or 26% to 30, or 32, or 34, or 36, or 38%. A desirable level of elasticity in the bCOC's is also reflected in its permanent set properties. In any embodiment, the bCOC has a permanent set within the range from 20, or 24, or 26% to 30, or 32, or 34, or 35%.

The bCOC's described herein are useful in any number of articles such as films (average thickness of less than 200 μm) sheets (average thickness of greater than or equal to 200 μm), molded articles (e.g., thermoformed, blow molded, extrusion molded, etc.), and tubing or piping, any of which can be foamed or non-foamed, comprising the bCOC, either alone as the primary polymeric component or in combination with other polymers such as propylene-based impact copolymers, ethylene-propylene-diene rubber (EPDM), high density polyethylene (HDPE), linear low density polyethylene (LLDPE), polypropylene, polystyrene, butyl-based polymers, aryl polyester carbonates, polyethylene terephthalate, polybutylene terephthalate, amorphous polyacrylate, nylon-6, nylon-6,6, further polyamides, polyaramids, polyether ketones, polyoxymethylene, polyoxyethylene, polyurethanes, polyether sulfones, and polyvinylidene fluoride. Preferably the bCOC is a modifier of such polymers, present at a level within a range from 0.2 wt % to 10 wt %.

The bCOC is particularly useful in compositions with polyethylene, as the blend has improved strain hardening useful for foaming applications. As used herein "polyethylene" is an ethylene-based polymer comprising at least 60, or 70, or 80 wt % ethylene derived units and can also comprise within a range from 40, or 30, or 20 to 0.1 wt % C3 to C12 α-olefin comonomer derived units. The polyethylene may be branched or linear, and is most preferably a low density polyethylene (LDPE), LLDPE, or HDPE having a density within a range from 0.88, or 0.90 g/cm³ to 0.925, or 0.93, or 0.96 g/cm³, and having a melt index (190° C./2.16 kg) within the range from 0.2 to 10 g/10 min. A particularly desired composition comprising (or consisting essentially of) the bCOC is a composition comprising within the range from 0.2, or 0.5, or 1 wt % to 3, or 4, or 5, or 8, or 10 wt % of the bCOC and a polyethylene, most preferably a LLDPE. In any embodiment, when the bCOC described herein is blended with a polyethylene, most preferably a LLDPE, within the range from 0.2, or 0.5, or 1 wt % to 3, or 4, or 5, or 8, or 10 wt %, the blend has a Strain Hardening Ratio (SHR) at 2.5 Hencky strain of greater than 1.0, or 1.5, or 2.0; or within a range from 1.0, or 1.5, or 2.0 to 10, or 12, or 14, or 16, or 18.

The bCOC compositions may further comprise "additives" within the range from 0.01 wt % to 1, or 2, or 3, or 4 wt %, by weight of the bCOC and additives, such additives including one or more fillers, antioxidants (including phenolic compounds, phosphites, and alkyl-radical scavengers such as lactones and tocopherol), anti-cling agents, tackifiers, UV stabilizers, heat stabilizers, anti-blocking agents, release agents, foaming agent, anti-static agents, pigments, colorants, dyes, waxes, silica, talc, or a combination thereof. Specific examples of additives are described in WO 2009/007265. In a particular embodiment, even when desirable compositions consists of the bCOC, the composition may include up to 0.5 wt %, by weight of the composition, of one or more antioxidants, or one or more antioxidants and one or more foaming agents.

A "foaming" or "blowing" agent is a substance which is capable of producing a cellular structure via a process of forming or releasing a gas within a variety of materials (molten, semi-molten, or otherwise) that undergo hardening or phase transition, such as polymers and plastics. Common foaming agents include sodium bicarbonate, carbon dioxide, and azobisformamide but there are many others well known in the art. Such agents may be present to any desirable level, in any embodiment, from 10, or 20, or 100 ppm to 1000, or 2000 ppm, up to 2, or 3 wt % or more as is known in the art for foaming agents.

The various descriptive elements and numerical ranges disclosed herein for the bCOC's and methods of forming such can be combined with other descriptive elements and numerical ranges to describe the bCOC's and desirable compositions including such; further, for a given element, any upper numerical limit can be combined with any lower numerical limit described herein, including the examples in jurisdictions that allow such combinations. The features of the bCOC's are demonstrated in the following non-limiting examples.

Test Methods

Differential Scanning Calorimetry (DSC) Procedure

The degree of crystallinity of a polyolefin is determined by dividing its heat of fusion measured by DSC with the heat of fusion for 100% crystalline polyethylene which has the value of 293 J/g (B. Wunderlich, THERMAL ANALYSIS, 417-431 (Academic Press, 1990)). The DSC procedure may be used to determine crystallinity as well as the glass transition temperature ($T_g$) and melting point temperature ($T_m$) of the bCOC. In particular, approximately 6 mg of material placed in microliter aluminum sample pan. The sample is placed in a differential scanning calorimeter (Perkin Elmer or TA Instrument Thermal Analysis System) and is heated from ambient to 210° C. at 10° C./minute and held at 210° C. for 5 minutes. Afterward, the sample is cooled down to −90° C. at 10° C./minute. The sample is held at −90° C. for 5 minutes and then heated from −90° C. to 210° C. at 10° C./minute for a second heating cycle. The $T_g$ and $T_m$ were determined after the second heating cycle, but the samples are not otherwise annealed. Melting temperature $T_m$, $T_g$ and heat of fusion were determined in the TA Universal Analysis on the second heating cycle. The Glass Transition menu item on the TA Universal Analysis equipment is used to calculate the onset, end, inflection, and signal change of $T_g$ in the DSC. The program enables the determination of the onset, which is the intersection of the first and second tangents, where the inflection is the portion of the curve between the first and third tangents with the steepest slope, and the end is the intersection of the second and third tangents.

Strain Hardening

Figure 2A:
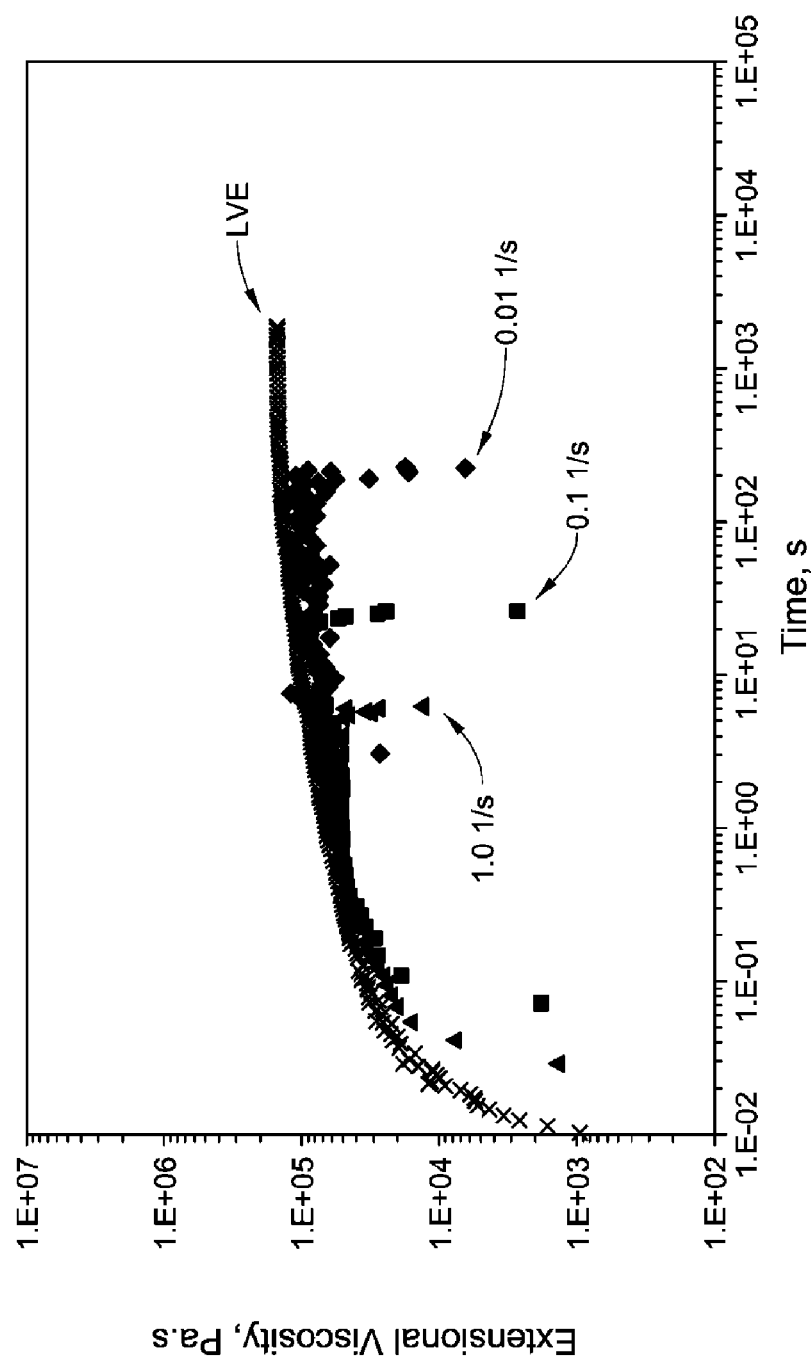
FIG. 2A is a plot of the Extension Viscosity as a function of time (seconds) of comparative 3 wt % Topas E-140 blended with Exceed™ 1018 LLDPE.
Figure 2B:
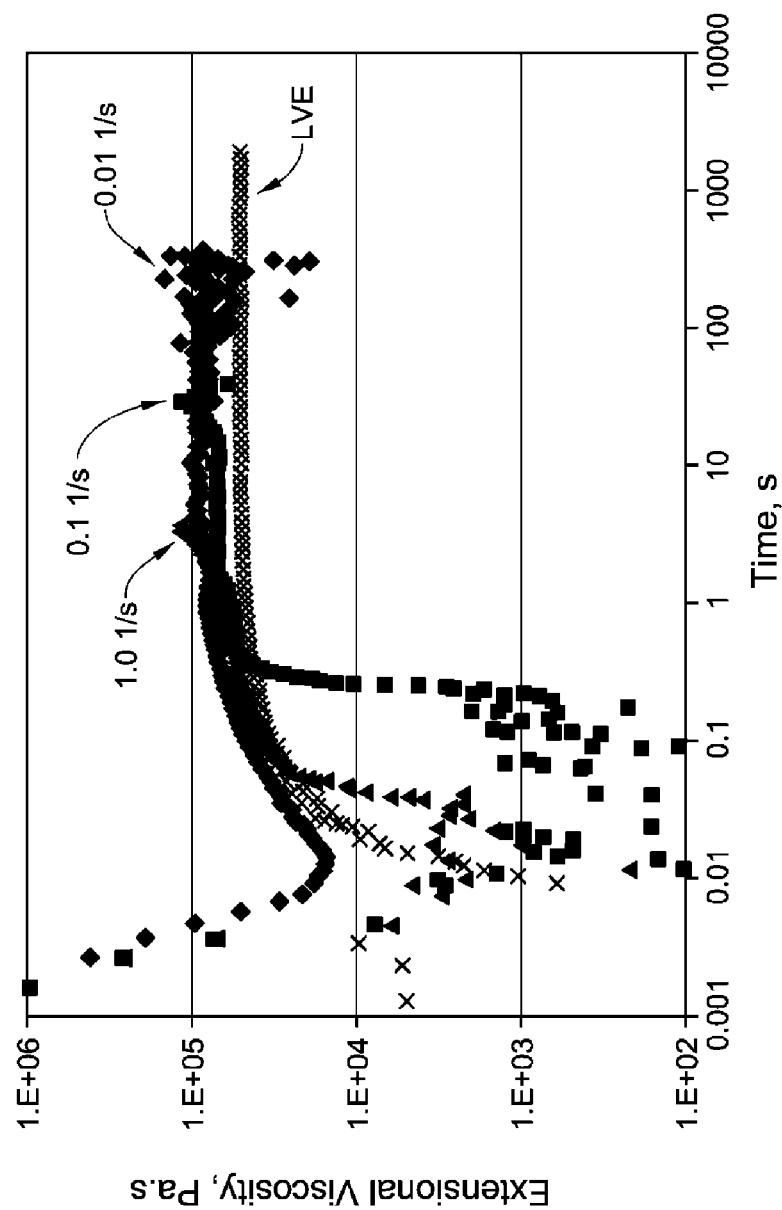
FIG. 2B is a plot of the Extension Viscosity as a function of time (seconds) of comparative 3 wt % Topas 5013 blended with Exceed 1018 LLDPE.
Figure 3:
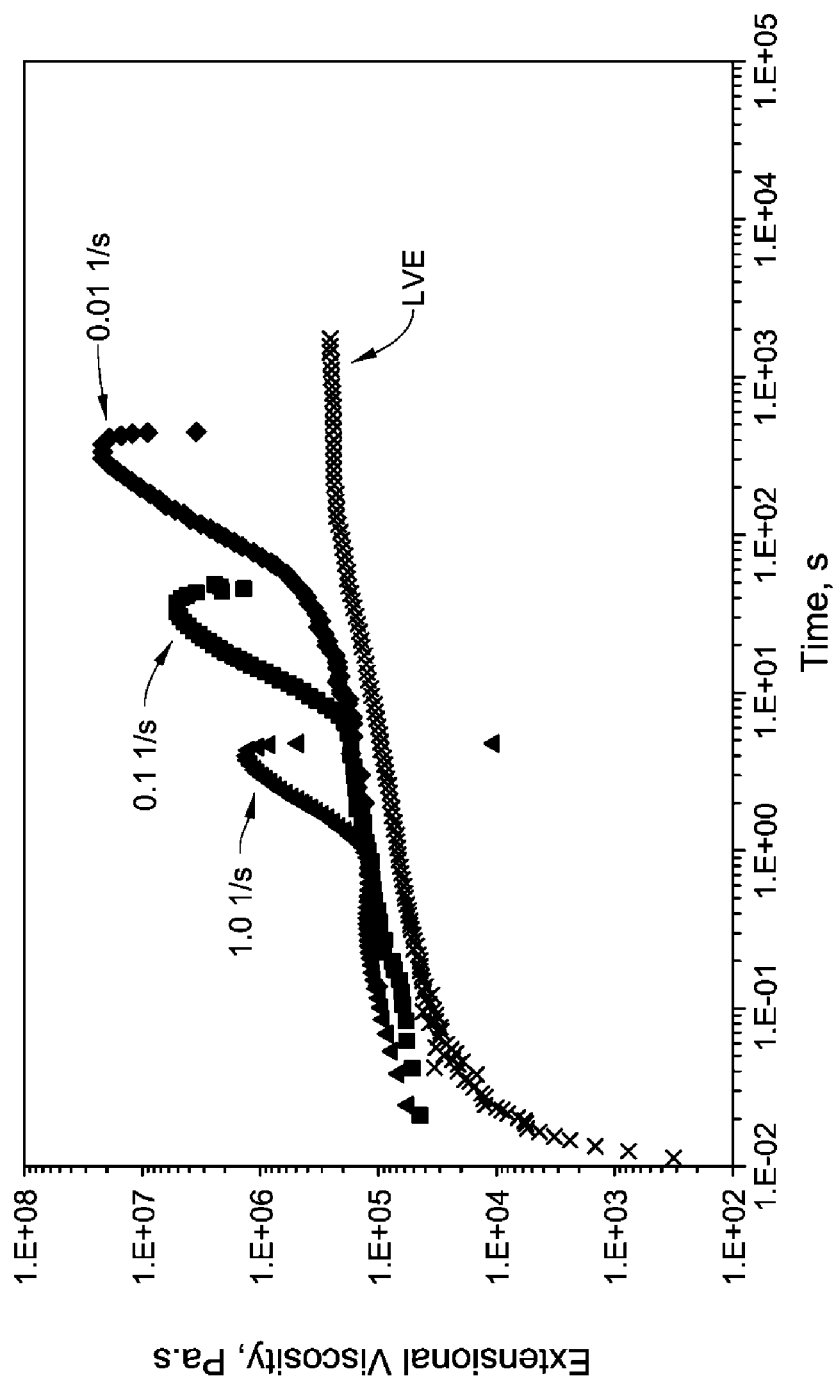
FIG. 3 is a plot of the Extension Viscosity as a function of time (seconds) of inventive 3 wt % bCOC described herein blended with Exceed 1018 LLDPE.

Extensional Rheometry was performed on an Anton-Paar MCR 501 or TA Instruments DHR-3 using a SER Universal Testing Platform (Xpansion Instruments, LLC), model SER2-P or SER3-G. The SER (Sentmanat Extensional Rheometer) Testing Platform is described in U.S. Pat. No. 6,578,413 and U.S. Pat. No. 6,691,569. A general description of transient uniaxial extensional viscosity measurements is provided, for example, in "Strain hardening of various polyolefins in uniaxial elongational flow," 47(3) THE SOCIETY OF RHEOLOGY, INC., J. RHEOL., 619-630 (2003); and "Measuring the transient extensional rheology of polyethylene melts using the SER universal testing platform," 49(3) THE SOCIETY OF RHEOLOGY, INC., J. RHEOL., 585-606 (2005). Strain hardening occurs when a polymer is subjected to uniaxial extension and the transient extensional viscosity increases more than what is predicted from linear viscoelastic theory. Strain hardening is observed as abrupt upswing of the extensional viscosity in the transient extensional viscosity versus time plot. A strain hardening ratio (SHR) is used to characterize the upswing in extensional viscosity and is defined as the ratio of the maximum transient extensional viscosity over three times the value of the transient zero-shear-rate viscosity at the same strain. Strain hardening is present in the material when the ratio is greater than 1. The SER instrument consists of paired master and slave windup drums mounted on bearings housed within a chassis and mechanically coupled via intermeshing gears. Rotation of the drive shaft results in a rotation of the affixed master drum and an equal but opposite rotation of the slave drum which causes the ends of the polymer sample to be sound up onto the drums resulting in the sample stretched. The sample is mounted to the drums via securing clamps in most cases. In addition to the extensional test, samples are also tested using transient steady shear conditions and matched to the extensional data using a correlation factor of three. This provides the linear viscoelastic envelope (LVE). Rectangular sample specimens with dimensions approximately 18.0 mm long× 12.70 mm wide are mounted on the SER fixture. Samples are generally tested at three Hencky strain rates: $0.01\ s^{-1}$, $0.1\ s^{-1}$ and $1\ s^{-1}$. The testing temperature is 150° C. The polymer samples were prepared as follows: the sample specimens were hot pressed at 190° C., mounted to the fixture, and equilibrated at 150° C. The results of these tests on the Example and comparative samples are shown in FIG. 2A, FIG. 2B, and FIG. 3.

Hysteresis and Permanent Set

The Rheometrics Solids Analyzer (RSA3) as used for the hysteresis measurements (such as in FIG. 6), and the permanent set was calculated from that under ASTM D412. The RSA3 imposes a tensile elongation on a polymer sample to determine the tensile strength of a sample. The hysteresis measurement gauges the stress on a sample as the rheometer imposes a specified elongation and immediate retraction of the polymer sample. The hysteresis of the sample under stress is done under elongation over two full cycles. The elongation measurement stretches a sample at a constant elongation rate (typically 0.333 mm/sec) until the sample breaks. The resulting stress under this deformation is measured and the stress at fracture determines the yield stress.

Samples were prepared as small dumb-bell shaped samples, the whole sample approximately 25.0 mm long by 13 mm wide by 0.5 mm thick polymer samples (wherein the middle of the dumb-bell is 2 mm wide by 5 mm long, connecting the two large ends that are 13 mm wide and 9 mm long). Samples were molded at approximately 190° C. on either a Carver Lab Press or Wabash Press. If no stabilizer or antioxidant is already present in the polymer sample, about 0.1 wt % of butylated hydroxytoluene (BHT) is added to the sample.

The polymer samples were loaded into the open oven of the RSA3 between tool clamps on both ends. The length of sample was recorded once sample was stabilized at the testing temperature. After the oven and sample has reached testing temperature of 25° C., the test was begun.

Calibration and quality control for the RSA3 measurements are conducted by performing a dynamic temperature ramp at 6.28 rad/s (1 Hz) from −100° C. to 40° C. at 0.05% strain on a standard sample of ExxonMobil Exact™ 4049 plastomer. The temperature corresponding to the local maximum of the tan delta curve is −40.5° C., and the tan delta is 0.3478.

Permanent set is a standard calculation under ASTM D412 in which a polymer sample of known length is stretched by a stated percentage for a period of time and is then released. After recovery the length is measured and the change in length (i.e., unrecovered length) is expressed as a percentage of the original length.

Branching

The Mn, Mw, and Mz, was calculated based on GPC-3D (MALLS) analysis. Size-Exclusion Chromatography ("SEC", also known as Gel Permeation Chromatography or "GPC") was carried out using a High Temperature Size Exclusion Chromatograph (either from Waters Corporation or Polymer Laboratories), with a differential refractive index detector (DRI), an online light scattering detector, and a viscometer (SEC-DRI-LS-VIS), and also a Multi-Angle Light Scattering detector ("MALLS"), where mono-dispersed polystyrene is the standard in all cases. The Mark-Houwink constants used were K=0.00070955, and a=0.65397, analyzed as EPDM with 0 wt % propylene. Three Polymer Laboratories PLgel 10 mm Mixed-B columns are used. The nominal flow rate is $0.5\ cm^3/min$ and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 μm glass pre-filter and subsequently through a 0.1 μm Teflon filter. The TCB is then degassed with an online degasser before entering the SEC. In the studies below, the Topas™ E-140 copolymer used as a comparative example was soluble in TCB (the GPC solvent) and generated good signals for analysis. The inventive bCOC was insoluble in TCB so unable to quantify in GPC directly. The existence of branching in the inventive bCOC is based on its behavior compared to other known branched polyolefins tested by the methods described herein.

Examples

Synthesis of bCOC

In a dry box, under nitrogen, 11 mg of the catalyst precursor p-triethylsilylphenylcarbyl (cyclopentadienyl)(2,7-di-t-butylfluorenyl) hafnium dimethyl was dissolved in 10 mL of dried toluene. Afterwards, 17 mg of dimethyl anilinium tetrakis(perfluorophenyl)borate activator was added, and 4 mg of the solution (1 mL=1 mg) was syringed into a catalyst charger. The charger was removed from the glove box along with a syringe of 0.3 mL tri-isobutylaluminum (TIBAL) 1 M in hexanes. At the same time, 10 mL of purified norbornene solution (filtered over neutral alumina, dried over 3 Å molecular sieves and sodium potassium alloy for 24 hours) was placed in a syringe. The catalyst charger was attached to a prepared 1-L Zipper Autoclave reactor (nitrogen purged 1 hour, 100° C. bake out and then cooled to 25° C.). TIBAL (0.3 mL) was syringed into the reactor with a low nitrogen purge on the reactor (0 to 2 psi). Then, norbornene (10 mL) was syringed into the reactor. Hexanes (600 mL) were added to the reactor and the stirrer was set at 800 rpm. The temperature was increased to 80° C. set point. Ethylene (200 psi) was introduced to the reactor through a flowmeter. Once the temperature and flow had equilibrated, the catalyst was introduced to the reactor with high pressure nitrogen at 20 lbs above the set pressure of the reactor (set at 250 psi). The flowmeter measured the flow of ethylene as the reaction continued for 46 minutes. After that time the reaction was stopped and cooled to room temperature (23° C.). The pressure was vented, the reactor was opened and the product (7.33 g) was recovered. The product was characterized by NMR. The norbornene content in the copolymer was calculated to be 5 mol % from the $^{13}$C NMR spectrum.

Properties of bCOC

The $^1$H NMR spectrum of the product was compared to Topas™ E-140 (commercial semi-crystalline elastomeric ethylene-norbornene copolymer comprising about 30 wt % cyclic olefin derived units, having a $T_m$ of 84° C. and $T_g$ of −6° C.). The $^1$H NMR study found there were no vinyl chain ends in the product while Topas E-140 contained vinyl chain ends. It is postulated that the catalyst used in the Topas E-140 production produced vinyl-terminated macromers ("VTM's") but the catalyst didn't re-incorporate the VTMs, resulting in a linear polymer, while the catalyst used in the current Example produced VTMs and subsequently re-incorporated the VTM's, resulting in a LCB polymer.

The LCB characteristics of the bCOC's were suggested by rheological measurements. As shown in FIG. 1, the product from Example 1 demonstrated significant shear thinning compared to Topas E-140, which showed a Newtonian behavior suggestive of a linear polymer.

Amorphous COC (Topas™ 5013 ethylene-norbornene copolymer, comprising about 75 wt % norbornene), linear semi-crystalline COC (Topas E-140), and LCB semi-crystalline COC (inventive bCOC) were each blended into Exceed™ 1018 linear low density polyethylene (ExxonMobil Chemical Company) at 3 wt % loadings. FIG. 2A is the extensional rheological curves of the Topas E-140 mixture with Exceed LLDPE at 3 wt %, while FIG. 2B is the extensional rheological curves of the Topas 5013 mixture with Exceed LLDPE at 3 wt % loading. It can be seen that the SHR for the Topas copolymers is well below 1. From extensional rheology, only the blends with the bCOC demonstrated strong strain hardening (SHR above 1) as shown in FIG. 3, and the strain hardening was substantial even at very low loading (1 wt %). The LCB semi-crystalline COC could potentially be an efficient low-loading additive to improve LLDPE processability and mechanical/thermal/optical properties.

TABLE 1

Thermal Properties of Topas E-140 and Inventive bCOC

| | $T_g$ (° C.) | $T_m$ (° C.) | crystallinity | NB mol %* |
|---|---|---|---|---|
| Topas E-140 | −3 | 86.0 | 24% | 11 |
| Inventive bCOC | −1 | 102.9 | 33% | 5 |

*Calculated from $^{13}$C NMR

Figure 4:
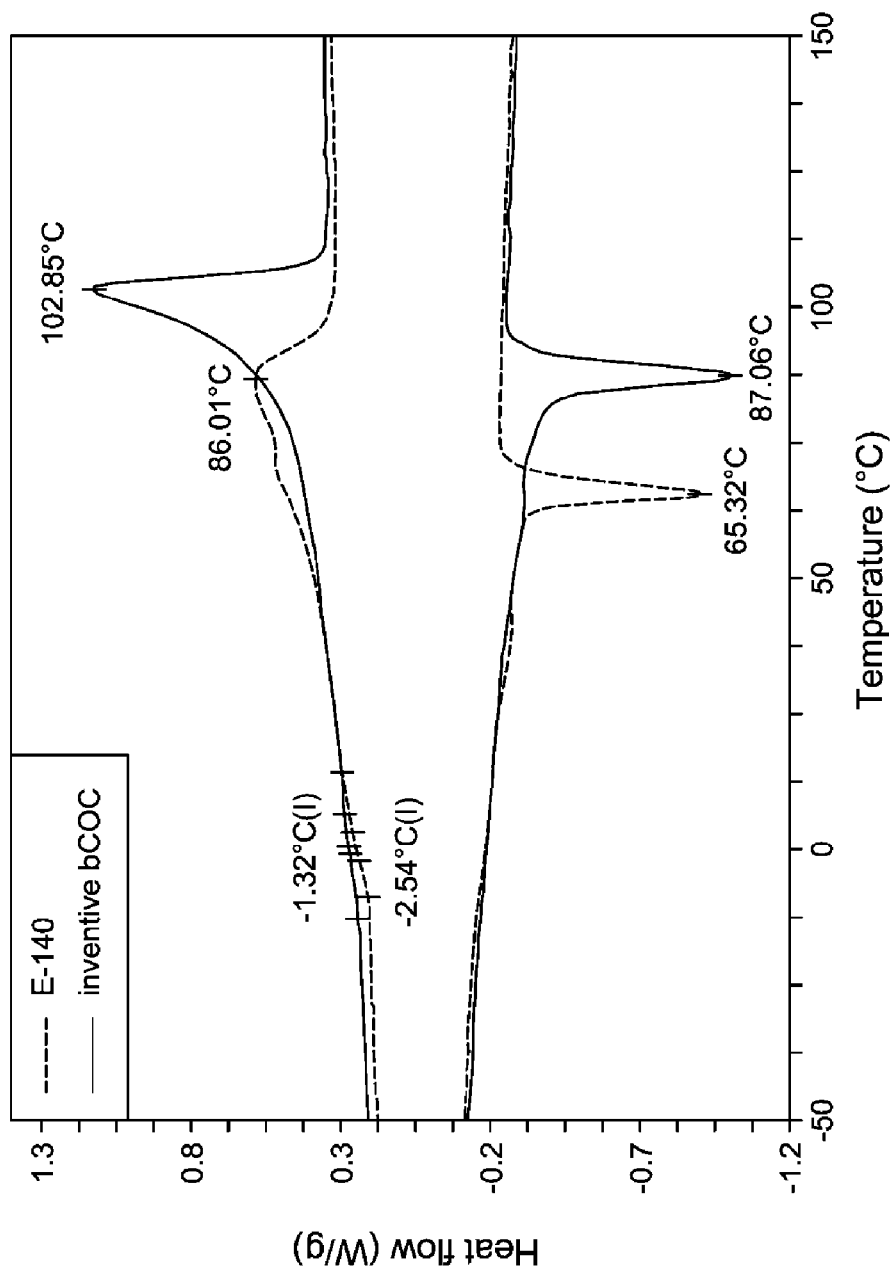
FIG. 4 is a graph of DSC overlay traces of a bCOC as described herein and a comparative Topas E-140 COC, where the parenthetical "I" means "inflection".
Figure 5:
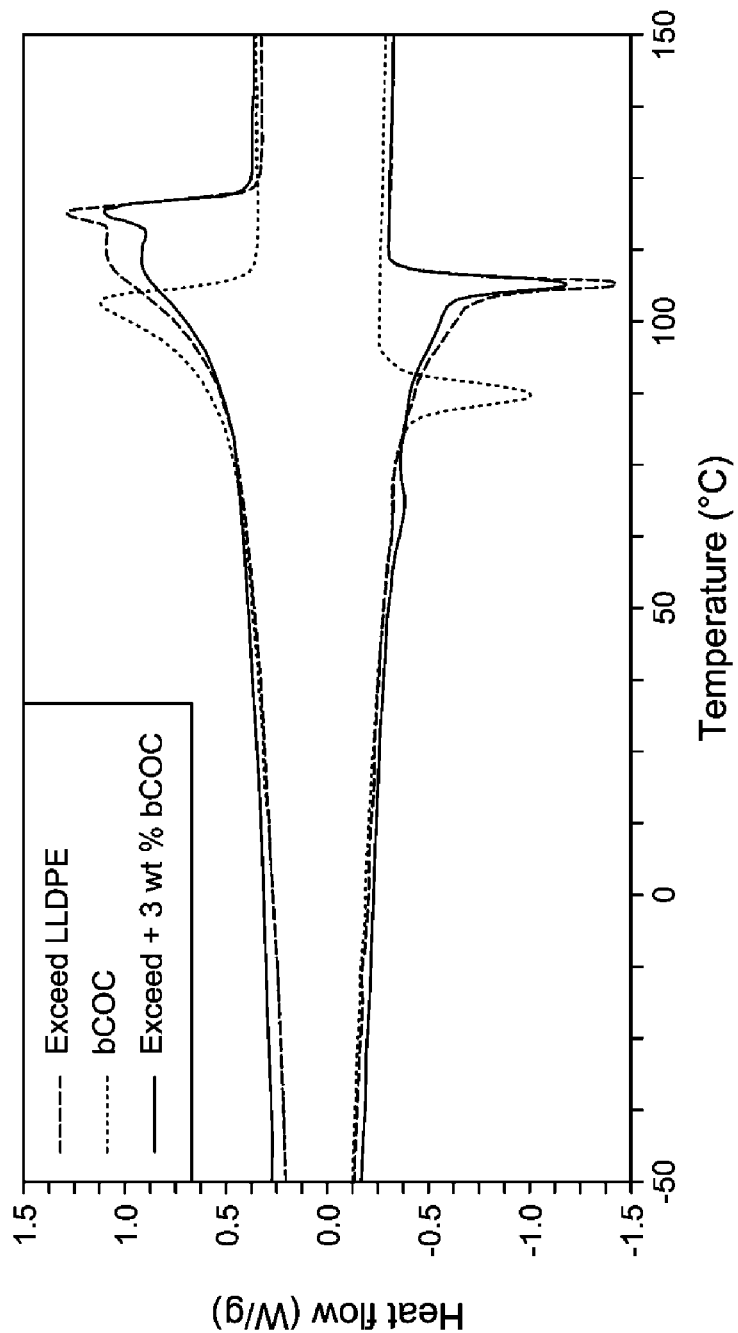
FIG. 5 is a graph of DSC overlay traces of Exceed 1018 LLDPE, a bCOC as described herein, and Exceed LLDPE with 3 wt % bCOC, by weight of the LLDPE and bCOC.

Thermal properties were measured by DSC and some of the traces shown in FIG. 4, and the results are summarized in Table 1. Additional DSC experiments on blends with the bCOC demonstrated that addition of amorphous COC (Topas 5013) into Exceed 1018 didn't affect its crystallization. However, when the bCOC was added into Exceed 1018, the crystallization of LLDPE was affected as shown in FIG. 5 and the melting/crystallization peaks of bCOC completely disappeared, implying the bCOC can co-crystallize with LLDPE, giving rise to improved miscibility compared to current COC's.

Figure 6:
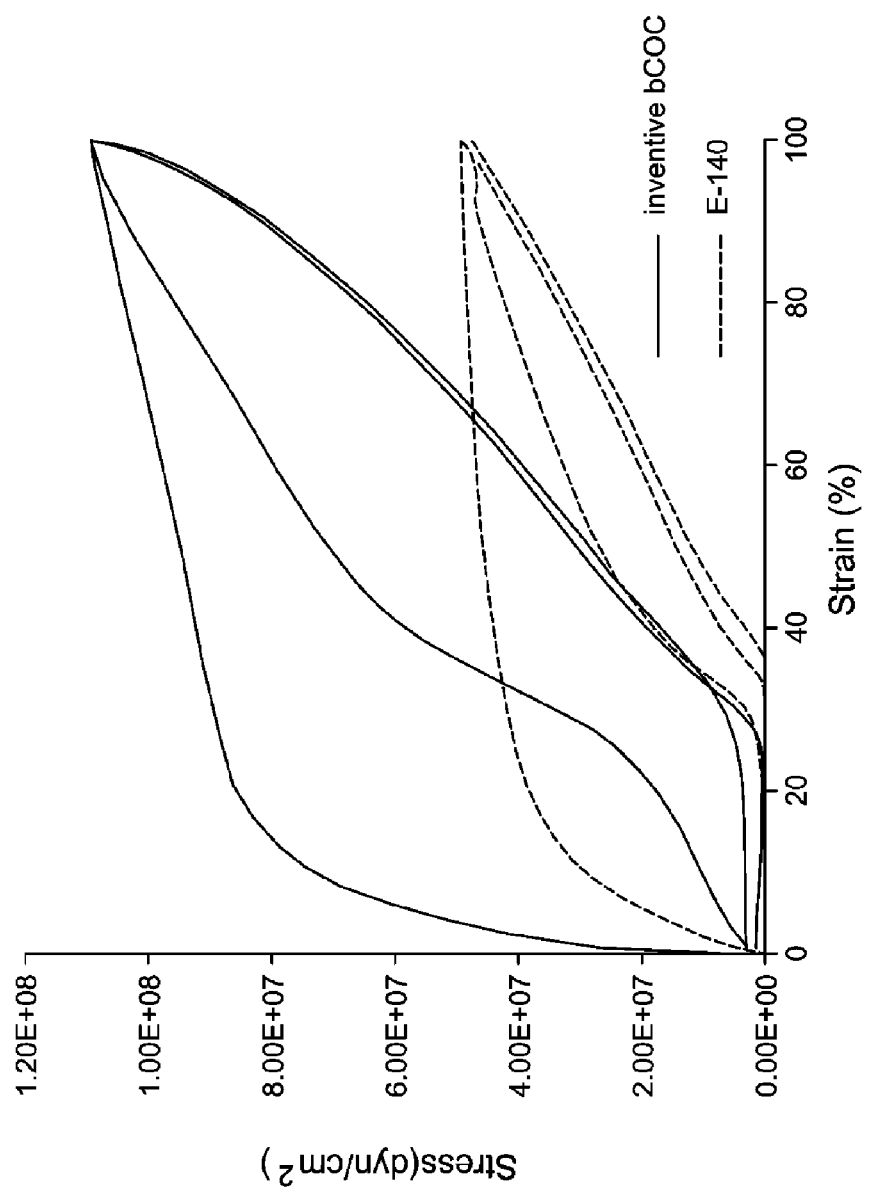
FIG. 6 is a graph of overlay hysteresis traces of a bCOC as described herein and a comparative Topas E-140 COC, with Stress in dyn/cm$^2$ as a function of strain (% of original size of sample).

As shown in the hysteresis measurements (permanent set) in FIG. 6, the bCOC demonstrated lower permanent set (better elastic recovery), and higher modulus/strength than the comparative commercial Topas E-140 copolymer. This suggests an improvement of the bCOC over the prior art in terms of elasticity kink resistance in, for example, tubing, especially tubing that has a wall thickness greater than 35 mil (890 μm, or within a range from 890 μm to 2000 or 3000 μm wall thickness). Overall, the bCOC's exhibit evidence of long chain branching due to its hysteresis behavior, as well as the strain hardening behavior.

Having described the various features of the bCOC's and methods of making them, described here in numbered paragraphs is:

P1. A branched cyclic olefin copolymer (bCOC) comprising (or consisting essentially of, or consisting of) within the range from 98 wt % to 50 wt % ethylene derived monomer units; and within the range from 2 wt % to 50 wt % of cyclic olefin derived monomer units.

P2. The bCOC of numbered paragraph 1, having a melting point temperature ($T_m$) within the range from 40° C. to 120° C.

P3. The bCOC of numbered paragraphs 1 or 2, having one or more glass-transition temperatures ($T_g$), the largest of which has a $T_g$ that is within the range from −20 C to 20° C.

P4. The bCOC of any one of the previous numbered paragraphs, having a percent crystallinity within a range from 20% to 38%.

P5. The bCOC of any one of the previous numbered paragraphs, having a permanent set within the range from 20% to 35%.

P6. The bCOC of any one of the previous numbered paragraphs, wherein the amount of cyclic olefin derived units in the bCOC is within a range from 1 mol % to 16 mol %; most preferably, the remainder are ethylene derived units.

P7. A composition comprising within the range from 0.2 wt % to 10 wt % of the bCOC of any one of the previous numbered paragraphs and a linear low density polyethylene.

P8. The bCOC of numbered paragraph 7, wherein when blended with a polyethylene within the range from 0.2 to 10 wt %, the blend has a Strain Hardening Ratio (SHR) at 2.5 Hencky strain of greater than 1.0.

P9. A sheet or molded article, foamed or non-foamed, comprising the bCOC of any one of the previous numbered paragraphs.

P10. A process for making a branched cyclic olefin copolymer (bCOC) of any one of the previous numbered paragraphs, comprising (or consisting essentially of, or consisting of) combining at a temperature within a range from 60° C. to 140° C. a catalyst precursor and an activator with a feed comprising (or consisting essentially of, or consisting of) ethylene and at least one cyclic olefin; where the catalyst precursor is selected from the group consisting of $C_S$-symmetric Group 4 metallocenes comprising any two ligands selected from cyclopentadienyl and ligands isolobal to the cyclopentadienyl group.

P11. The process of numbered paragraph 10, wherein the ligands isolobal to the cyclopentadienyl group are selected from the group consisting of indenyl, benzindenyl, fluorenyl, octahydrofluorenyl, cyclooctatetraenyl, cyclopentaphenanthrenyl, hydrogenated or partially hydrogenated versions thereof, substituted versions thereof, and heterocyclic versions thereof.

P12. The process of numbered paragraphs 10 or 11, wherein at least one of the two ligands is mono- or di-substituted with groups selected from C1 to C12 alkyls, C3 to C16 iso-alkyls, C6 to C24 aryls, C9 to C24 fused multi-ring aryls, C5 to C20 nitrogen and/or sulfur heterocycles, and combinations thereof.

P13. The process of any one of numbered paragraphs 10 to 12, wherein at least one of the two ligands is mono- or di-substituted with groups selected from iso-propyl, iso-butyl, tert-butyl, phenyl, alkylphenyl, and dialkylphenyl.

P14. The process of any one of numbered paragraphs 10 to 13, wherein the catalyst precursor is selected from $C_S$-symmetric ansa-metallocenes.

P15. The process of numbered paragraph 14, wherein the bridging group comprises at least one phenyl group, alkyl substituted phenyl group, or silyl substituted phenyl group.

P16. The process of any one of numbered paragraphs 10 to 15, wherein the activator comprises a non-coordinating borate anion, preferably tetra(perfluorinated C6 to C14 aryl) borate anion.

P17. The process of numbered paragraph 16, wherein the activator also comprises a bulky organic cation; preferably wherein the bulky organic cation is selected from the following structures:

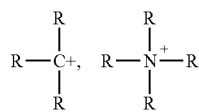

wherein each R group is independently hydrogen, a C6 to C14 aryl (e.g., phenyl, naphthyl, etc.), a C1 to C10 or C20 alkyl, or a substituted C6 to C14 aryl; and most preferably at least one R group is an C6 to C14 aryl or substituted C6 to C14 aryl.

P18. The process of any one of numbered paragraphs 10 to 17, wherein the catalyst precursor is selected from the following structures:

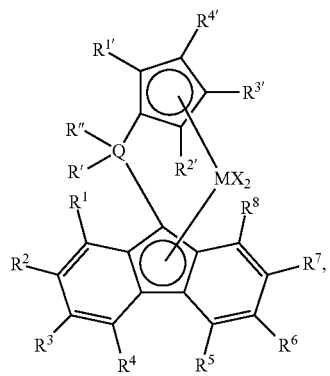

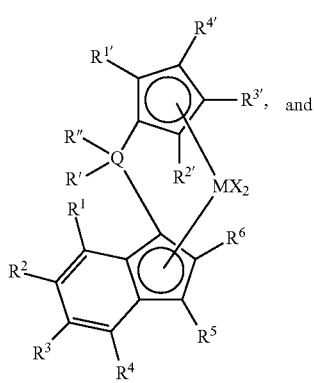

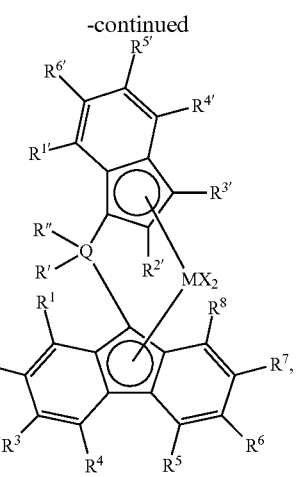

wherein M is a Group 4 metal; Q is silicon or carbon; R' and R" are independently selected from phenyl, alkyl substituted phenyl, and silyl substituted phenyl; each X is independently selected from C1 to C10 alkyls, phenyls, and halogens; each of $R^1$ to $R^8$ is independently selected from hydrogen, C1 to C10 alkyls, phenyls, and alkylphenyls; and each of $R^{1'}$ to $R^{6'}$ is independently selected from hydrogen, C1 to C10 alkyls, and phenyls.

P19. The process of any one of numbered paragraphs 10 to 18, wherein the catalyst precursor is selected from:

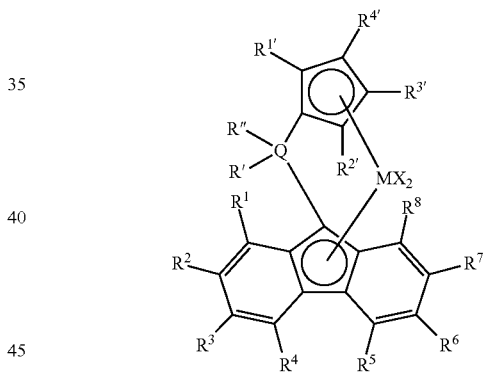

wherein M is a Group 4 metal; Q is silicon or carbon; R' and R" are selected from phenyl, alkyl substituted phenyl, and silyl substituted phenyl; each X is independently selected from C1 to C10 alkyls, phenyls, and halogens; each of $R^1$ to $R^8$ is independently selected from hydrogen, C1 to C10 alkyls, phenyls, and alkylphenyls; and each of $R^{1'}$ to $R^{6'}$ is independently selected from hydrogen, C1 to C10 alkyls, and phenyls.

P20. The process of any one of numbered paragraphs 10 to 19, wherein the cyclic olefin is selected from C5 to C20 olefins comprising at least one C5 to C8 cyclic structure.

P21. The process of any one of numbered paragraphs 10 to 20, where the combining occurs at a pressure of at least 0.8 MPa.

P22. The process of any one of numbered paragraphs 10 to 21, wherein the amount of cyclic olefin derived units in the bCOC is within a range from 1, or 2, or 3 mol % to 8, or 10, or 12, or 16 mol %.

Also disclosed is the use of a branched cyclic olefin copolymer (bCOC) as in any one of the numbered paragraphs 1 to 8 in a composition with a polyethylene. Also disclosed is the use of a bCOC as in any one of the numbered paragraphs 1 to 8 in an article. Finally, disclosed herein is the use of a catalyst precursor selected from the group consisting of $C_S$-symmetric Group 4 metallocenes comprising any two ligands selected from cyclopentadienyl and ligands isolobal to the cyclopentadienyl group with ethylene and a cyclic olefin as in any of the numbered paragraphs 10 to 22 to produce a bCOC.

The phrase "consisting essentially of" in a polymer composition or components in a process means that no other additives, monomers, and/or catalysts are present in the composition or process being referred to other than those named, or, if present, are present to a level no greater than 0.5, or 1.0, or 2.0, or 4.0 wt % by weight of the composition; in a polymer, the phrase "consisting essentially of" means that only the named monomer-derived units are present, and if any others are present, they are present to a level no greater than 0.5, or 0.2 wt % by weight of the polymer; and also in a process, "process . . . consisting essentially of" means that no other major process step is present that effects the formation of covalent chemical bonds between two or more moieties, for example, exposure to external radiation, addition of reactive cross-linking agents, another polymerization step, etc., but minor process features and changes that effect the rate of covalent bond formation as is claimed may be present, such as, for example, a change in temperature or pressure or concentration of components.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A composition comprising a polyethylene and a branched cyclic olefin copolymer (bCOC) in the range from 0.2 wt % to 10 wt % of the composition, the bCOC consisting essentially of ethylene derived monomer units, and cyclic olefin derived monomer units in the range from 1 mol % to 8 mol % based on the total moles of monomer units of bCOC, wherein the bCOC has one or more glass-transition temperatures (Tg), the largest of which has a Tg that is within the range from −20° C. to 20° C.; and wherein the composition possesses a Strain Hardening Ratio (SHR) at 2.5 Heneky strain of greater than 1.0.

2. The composition of claim 1, the bCOC having a melting point temperature ($T_m$) within the range from 40° C. to 120° C.

3. The composition of claim 1, the bCOC having one or more glass-transition temperatures ($T_g$), the largest of which has a $T_g$ that is within the range from −20° C. to 15° C.

4. The composition of claim 1, the bCOC having a percent crystallinity within a range from 20% to 38%.

5. The composition of claim 1, the bCOC having a permanent set within the range from 20% to 35%.

6. The composition of claim 1, wherein the amount of cyclic olefin derived units in the bCOC is within a range from 2 mol % to 8 mol %.

7. A sheet or molded article, foamed or non-foamed, comprising the bCOC of claim 1.

8. The composition of claim 1, wherein the bCOC is made by a process comprising combining at a temperature within a range from 60° C. to 140° C. a catalyst precursor and an activator with a feed comprising ethylene and at least one cyclic olefin; where the catalyst precursor is selected from the group consisting of $C_S$-symmetric Group 4 metallocenes comprising any two ligands selected from cyclopentadienyl and ligands isolobal to the cyclopentadienyl group, and isolating the bCOC.

9. The composition of claim 8, wherein the catalyst precursor is selected from $C_S$-symmetric ansa-metallocenes.

10. The composition of claim 9, wherein the bridging group comprises at least one phenyl group, alkyl substituted phenyl group, or silyl substituted phenyl group.

11. The composition of claim 1, wherein the bCOC has an Mz/Mw within a range from 2.2 to 3.4.

* * * * *